US012403637B2

(12) United States Patent
Murasaki et al.

(10) Patent No.: US 12,403,637 B2
(45) Date of Patent: Sep. 2, 2025

(54) MOLDING DIE FOR MOLDING AN ENDLESS-SHAPED GASKET MADE OF AN ELASTIC MATERIAL ALONG A SURFACE OF A PLATE-LIKE BASE MATERIAL

(71) Applicant: NOK CORPORATION, Tokyo (JP)

(72) Inventors: Shun Murasaki, Kikugawa (JP); Bunpei Yoshida, Fujisawa (JP)

(73) Assignee: NOK CORPORATION (JP)

( * ) Notice: Subject to any disclaimer, the term of this patent is extended or adjusted under 35 U.S.C. 154(b) by 434 days.

(21) Appl. No.: 17/779,632

(22) PCT Filed: Oct. 27, 2020

(86) PCT No.: PCT/JP2020/040250
§ 371 (c)(1),
(2) Date: May 25, 2022

(87) PCT Pub. No.: WO2021/145047
PCT Pub. Date: Jul. 22, 2021

(65) Prior Publication Data
US 2023/0001613 A1 Jan. 5, 2023

(30) Foreign Application Priority Data

Jan. 16, 2020 (JP) .................................. 2020-004890

(51) Int. Cl.
*B29C 45/00* (2006.01)
*B29C 33/42* (2006.01)
(Continued)

(52) U.S. Cl.
CPC .......... *B29C 45/0025* (2013.01); *B29C 33/42* (2013.01); *B29C 45/14336* (2013.01);
(Continued)

(58) Field of Classification Search
CPC ................ B29C 45/0025; B29C 45/34; B29C 2045/0027
See application file for complete search history.

(56) References Cited

U.S. PATENT DOCUMENTS 5,546,285 A * 8/1996 Takikawa ................ F21S 41/28
362/509
5,711,910 A * 1/1998 Kostrivas ............ B29C 45/2708
425/572
(Continued)

FOREIGN PATENT DOCUMENTS

JP S60-087044 A 5/1985
JP 2000-185116 A 7/2000
(Continued)

OTHER PUBLICATIONS

Extended European Search Report for corresponding Patent Application No. 20913649.8 dated Mar. 14, 2024 (7 Page).
(Continued)

*Primary Examiner* — Benjamin A Schiffman
(74) *Attorney, Agent, or Firm* — Harness, Dickey & Pierce, P.L.C.

(57) ABSTRACT

A molding die for molding, on a surface of a plate-like base material, an endless-shaped gasket made of an elastic material includes a cavity which is formed on the opposing surface opposed to the surface of the base material and corresponds to the shape of the gasket, a gate for introducing a molding material which is cured to become an elastic material, a first intermediate portion connecting a gate opening and the cavity and a cross section along the base surface has an area equal to or larger than an opening area of the gate opening, a vent discharging gas unnecessary for molding, and a second intermediate portion connecting an opening on the cavity portion side of the vent extending along the base surface and the cavity and a cross section
(Continued)

along the base surface has a cross-sectional area equal to or larger than an area of the gate opening.

3 Claims, 4 Drawing Sheets (51) Int. Cl.
    *B29C 45/14*     (2006.01)
    *B29C 45/27*     (2006.01)
    *B29C 45/34*     (2006.01)
    *B29C 45/38*     (2006.01)
    *H01M 8/0276*     (2016.01)
    *H01M 8/0286*     (2016.01)
    *B29K 21/00*     (2006.01)
    *B29L 31/26*     (2006.01)

(52) U.S. Cl.
    CPC .......... *B29C 45/2708* (2013.01); *B29C 45/34* (2013.01); *B29C 45/38* (2013.01); *H01M 8/0276* (2013.01); *H01M 8/0286* (2013.01); *B29C 2045/14459* (2013.01); *B29K 2021/00* (2013.01); *B29L 2031/265* (2013.01); *Y02E 60/50* (2013.01)

(56) References Cited

U.S. PATENT DOCUMENTS

| | | | | |
|---|---|---|---|---|
| 7,419,119 | B2 * | 9/2008 | Horita | B29C 45/0025 |
| | | | | 242/610.6 |
| 7,559,761 | B2 * | 7/2009 | Inoue | B29C 45/263 |
| | | | | 425/546 |
| 8,313,681 | B2 * | 11/2012 | Watanabe | B29C 45/14336 |
| | | | | 264/273 |
| 8,784,724 | B2 * | 7/2014 | Watanabe | H01M 8/0286 |
| | | | | 264/328.2 |
| 9,381,686 | B2 * | 7/2016 | Kato | B29C 45/0046 |
| 9,855,690 | B2 * | 1/2018 | Motoda | F16H 55/06 |
| 10,513,068 | B2 * | 12/2019 | Masaka | F16J 15/10 |
| 10,589,448 | B2 * | 3/2020 | Bessho | B29C 45/26 |
| 10,717,219 | B2 * | 7/2020 | Yoshida | B29C 45/0025 |
| 11,465,321 | B2 * | 10/2022 | Suzuki | B29C 45/401 |
| 2009/0295023 | A1 * | 12/2009 | Nagashima | B29C 45/0025 |
| | | | | 425/542 |
| 2010/0327491 | A1 * | 12/2010 | Nagashima | B29C 45/0025 |
| | | | | 425/567 |
| 2011/0045123 | A1 * | 2/2011 | Nakata | B29C 45/2708 |
| | | | | 425/557 |
| 2011/0127693 | A1 | 6/2011 | Shimoto et al. | |
| 2011/0311680 | A1 * | 12/2011 | Takase | A23L 27/21 |
| | | | | 426/535 |
| 2012/0018927 | A1 | 1/2012 | Watanabe | |
| 2015/0295210 | A1 | 10/2015 | Horimoto et al. | |
| 2018/0250858 | A1 * | 9/2018 | Lin | A23G 3/0031 |
| 2018/0281247 | A1 * | 10/2018 | Kodaira | B29C 45/0025 |
| 2022/0134613 | A1 * | 5/2022 | Haidt | B29C 45/26 |
| | | | | 264/161 |
| 2022/0134619 | A1 * | 5/2022 | Mantyla | B29C 45/1635 |
| | | | | 264/255 |
| 2022/0359889 | A1 * | 11/2022 | Ringk | H01M 8/0286 |
| 2023/0001613 | A1 * | 1/2023 | Murasaki | B29C 45/38 |
| 2023/0195035 | A1 * | 6/2023 | Enggist | G04D 3/0048 |
| | | | | 368/232 |

FOREIGN PATENT DOCUMENTS

| | | |
|---|---|---|
| JP | 2010-003508 A | 1/2010 |
| JP | 2011-098480 A | 5/2011 |
| JP | 5585754 B2 | 9/2014 |
| WO | 2010-113558 A1 | 10/2010 |

OTHER PUBLICATIONS

International Search Report (English and Japanese) issued in PCT/JP2020/040250, mailed Dec. 1, 2020; ISA/JP (5 pages).

* cited by examiner

MOLDING DIE FOR MOLDING AN ENDLESS-SHAPED GASKET MADE OF AN ELASTIC MATERIAL ALONG A SURFACE OF A PLATE-LIKE BASE MATERIAL

CROSS REFERENCE TO RELATED APPLICATIONS

This application is a U.S. National Phase Application under 35 U.S.C. 371 of International Application No. PCT/JP2020/040250, filed on Oct. 27, 2020, which claims priority to Japanese Patent Application No. 2020-004890, filed on Jan. 16, 2020. The entire disclosures of the above applications are expressly incorporated by reference herein.

BACKGROUND OF THE INVENTION

Field of the Invention

The present invention relates to a molding die for molding, on a surface of a plate-like base material, an endless-shaped gasket made of an elastic material and extending along the surface of the plate-like base material, and a seal part comprising the plate-like base material and the endless-shaped gasket made of an elastic material and extending along the surface of the base material molded on the surface of the base material.

Description of Related Art

Conventionally, a molding die for molding, on a surface of a plate-like base material, an endless-shaped gasket made of an elastic material and extending along the surface of the plate-like base material has been known (see, for example, International Publication WO 2010/113558). Such a molding die can be used, for example, in the manufacture of seal parts that prevent leakage of fluid on the base material with a gasket. As the typical example of such seal parts, the seal parts for separators which are laminated on both sides of a membrane/electrode assembly (hereinafter referred to as MEA) in a fuel cell are well known. In the separator of the fuel cell, it is necessary to supply the fluid for the fuel cell (such as a fuel gas containing hydrogen and an oxidant gas containing oxygen) to the MEA so as not to leak to the outside, and the endless-shaped gasket serves to seal such fluid for the fuel cell in the space enclosed by the gasket.

Figure 4:
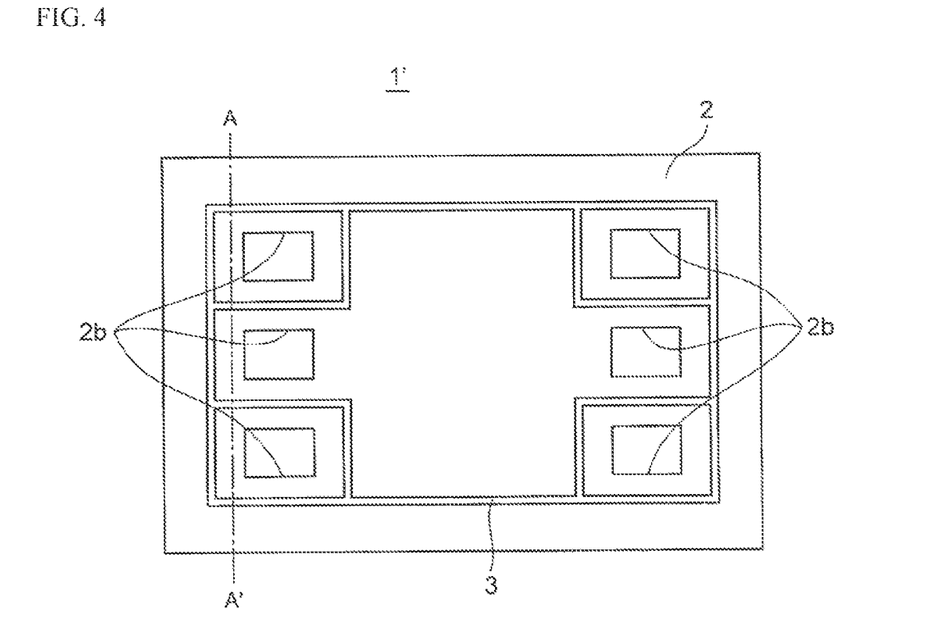
FIG. 4 is a schematic diagram of a seal part for the separator of the fuel cell.
Figure 5:
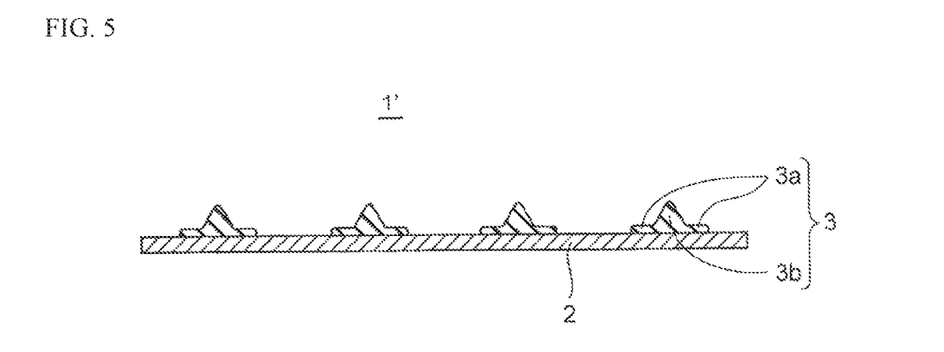
FIG. 5 is a schematic cross-sectional view of the seal part shown in FIG. 4.

FIG. 4 is a schematic view of a seal part 1' for the separator of the fuel cell. FIG. 5 is a schematic cross-sectional view of the seal part 1' shown in FIG. 4.

As shown in FIG. 4, in the seal part 1', an endless-shaped gasket 3 made of an elastic material and extending along a surface of a base material 2 is formed around a vent hole 2b on the surface of the plate-like base material 2. FIG. 5 shows a schematic cross section of the seal part 1' along the line AA' in FIG. 4, and the gasket 3 is represented as four protrusions protruding from the surface of the base material 2. As shown in FIG. 5, the gasket 3 has a base portion 3a adhered to the surface of the base material 2, and a seal lip portion 3b raised from the base portion 3a in a mountain shape. On the line AA' of FIG. 4, there is a portion where the molding material of the gasket 3 flows in and out during the molding of the gasket 3, as will be described later. In the following, a conventional molding die for manufacturing a seal part 1' for the separator of the fuel cell as shown in FIGS. 4 and 5 by molding the gasket 3 on the surface of the base material 2 will be described.

Figure 6:
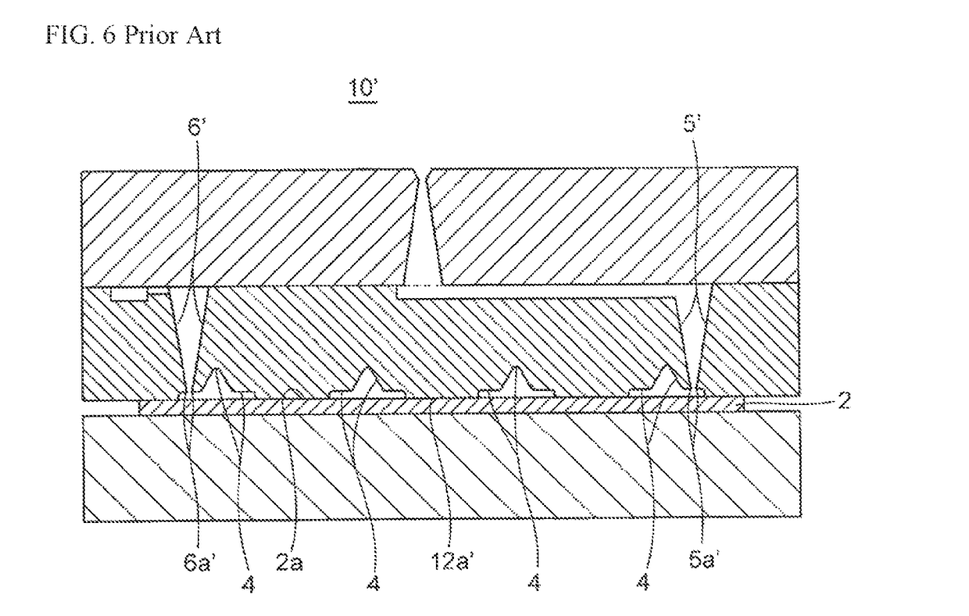
FIG. 6 is a schematic cross-sectional view of a conventional molding die for molding a gasket on the surface of the base material.

FIG. 6 is a schematic cross-sectional view of a conventional molding die 10' for molding a gasket 3 on the surface 2a of the base material 2.

In FIG. 6, the cross section of the portion for realizing the cross-sectional shape of FIG. 5 of the seal part 1' in the conventional molding die 10' for molding a gasket 3 on the surface 2a of the base material 2, is shown. As shown in FIG. 6, the conventional molding die 10' comprises a cavity portion 4, a gate 5', and a vent 6'. The cavity portion 4 is formed on an opposing surface 12a' of the molding die 10' opposed to the surface 2a of the base material 2, and is a portion having a mold shape corresponding to the endless shape of the gasket 3 of FIGS. 4 and 5. The gate 5' is a hole extending toward the cavity portion 4 in the molding die 10' and is a hole for introducing a flowable molding material, which is cured to become the above-mentioned elastic material, into the cavity portion 4. Further, the vent 6' is a hole extending in a direction away from the cavity portion 4 in the molding die 10', and is a hole for discharging unnecessary gas unnecessary for molding the gasket in the cavity portion 4 from the cavity portion 4. The excess molding material after filling all the cavity portions 4 is also discharged from the cavity portion 4 to the vent 6'.

In the conventional molding die 10', after the molding material is injected into the molding die 10' and the cavity portion 4 is filled with the molding material, the molding material is cured to form the gasket 3 made of an elastic material (see FIGS. 4 and 5) on the surface 2a of the base material 2. However, the molding material accumulated in the gate 5' and the vent 6' is also cured, and is connected to the gasket 3 near the opening 5a' of the molding material in the gate 5' or near the opening 6a' of the molding material in the vent 6'. When the base material 2 is removed from the molding die 10', the gasket 3 is separated from the other portions, whereby the seal part 1' in which the gasket 3 is formed on the surface 2a of the base material 2 is completed.

However, when the gasket 3 is separated from the other portions, such separation may be performed at a place originally belonging to the gasket 3 and a chipping (gouging) in which the surface 2a of the base material 2 is exposed may occur.

Figure 7:
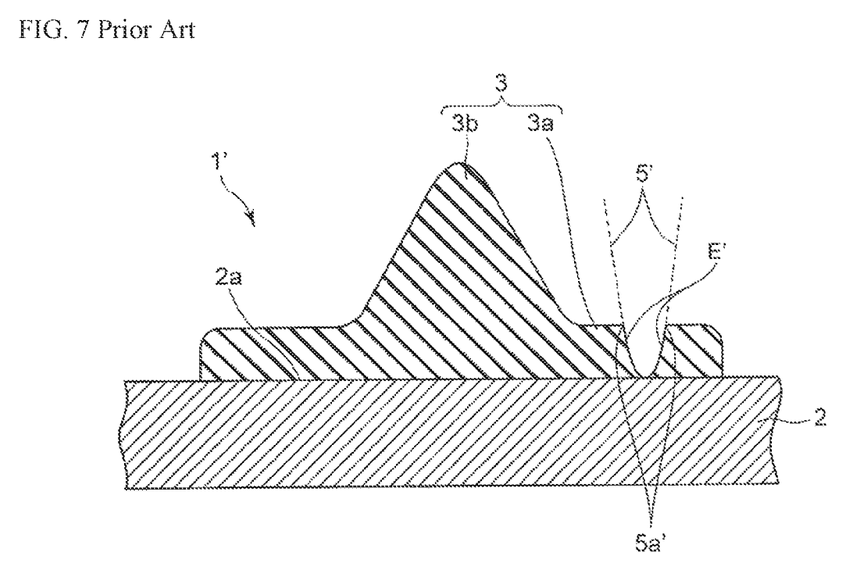
FIG. 7 shows a gouging that occurs in a gasket.

FIG. 7 shows a gouging E' occurred in the gasket 3.

FIG. 7 shows a state in which the gouging E' occurs in the base portion 3a in the vicinity of the opening 5a' of the gate 5' and the surface 2a of the base material 2 is exposed. In the state in which the surface 2a of the base material 2 is exposed as described above, there is a concern that the insulation property is deteriorated. In the above description, the gouging E' occurred in the gasket 3 in the vicinity of the gate 5' is taken as an example, but the same gouging may occur in the gasket 3 in the vicinity of the vent 6'.

In view of the above circumstances, in the present invention, a molding die for suppressing deterioration of insulation property due to gouging, and a seal part in which deterioration of insulation property due to gouging is suppressed, have been realized.

BRIEF SUMMARY OF THE INVENTION

In order to solve the above-mentioned problems, the present invention provides the following molding die and seal part.

[1] A molding die for molding, on a surface of a plate-like base material, an endless-shaped gasket made of an elastic material and extending along the surface of the base material comprising: a cavity portion formed on an opposing surface of the molding die opposed to the surface of the base material and having a mold shape corresponding to the endless shape of the gasket; a gate extending toward the cavity portion in the molding die and for introducing a flowable molding material, which is cured to become the elastic material, into the cavity portion; a first intermediate portion for receiving the molding material from the gate and feeding to the cavity portion, wherein the first intermediate portion connects an opening of the gate opened toward the cavity portion side and the cavity portion, and a cross section of the first intermediate portion along the surface of the base material has a cross-sectional area equal to or larger than an opening area of the opening of the gate; a vent extending in a direction away from the cavity portion in the molding die and for discharging an unnecessary gas unnecessary for molding the gasket in the cavity portion from the cavity portion; and a second intermediate portion for receiving the unnecessary gas from the cavity portion and feeding to the vent, wherein the second intermediate portion connects an opening of the vent opened toward the cavity portion side and the cavity portion, and a cross section of the second intermediate portion along the surface of the base material has a cross-sectional area equal to or larger than an opening area of the opening of the vent.

Here, the "endless shape" refers to a shape that circulates and returns while continuously extending one-dimensionally, and has no end portion because it circulates and returns. Further, the "cavity portion", the "gate", the "vent", the "first intermediate portion", and the "second intermediate portion" both refer to the shape of a portion of the molding die forming a specific space, and they do not refer to the insubstantial space itself. In addition, the "elastic material" described above includes a resin material having elasticity as well as a rubber material.

[2] The molding die according to [1], wherein the molding die is a split-typed molding die, comprising: a first split mold for mounting the base material in contact with a surface of the base material on the opposite side of the surface of the base material; a second split mold for fixing the base material by sandwiching the base material with the first split mold, wherein the second split mold has the opposing surface on which the cavity portion is formed as a surface on which the base material is sandwiched, and the gate, the first intermediate portion, the vent, and the second intermediate portion are formed inside the second split mold, and further a runner extending in a direction along the base material on a surface on the opposite side of the opposing surface and connected to the gate is formed inside the second split mold; and a third split mold laminated on the surface on the opposite side of the second split mold, wherein a spool penetrating the third split mold and connected to the runner of the second split mold is formed inside the third split mold.

[3] The molding die according to [1] or [2], wherein the molding die is a molding die for manufacturing a seal part for a fuel cell in which the gasket is integrally molded on the base material.

[4] A seal part comprising: a plate-like base material; and an endless-shaped gasket formed on a surface of the base material, made of an elastic material and extending along the surface of the base material, wherein the gasket is formed by injecting a flowable molding material, which is cured to become the elastic material, into a molding die having a gate and a vent, and the seal part has a pedestal protruding away from the surface of the base material at each of a position close to the gate at the time of molding and a position close to the vent at the time of molding.

In the molding die of the present invention, the gate or vent is not open directly to the cavity portion, but rather to the first intermediate portion and the second intermediate portion provided between the gate and the cavity portion and between the vent and the cavity portion. Since such a first intermediate portion and a second intermediate portion are interposed, although the gouging may occur in the molding material cured at the intermediate portion, it is unlikely that a gouging that exposes the surface of the base material will occur. Similarly, in the seal part of the present invention, the presence of the pedestal makes the gouging that exposes the surface of the base material less likely to occur. As a result, in the present invention, the deterioration of insulation property due to gouging is suppressed.

DETAILED DESCRIPTION OF THE INVENTION

Embodiments of the present invention will be described below with reference to the drawings. It should be understood that the present invention is not limited to the following embodiments, and that appropriate design changes, improvements, and the like can be added based on ordinary knowledge of a person skilled in the art without departing from the spirit of the present invention.

In the following, the case where the molding die of the present embodiment is a molding die for manufacturing a seal part which is the same type of the seal part 1' shown in FIGS. 4 and 5 (however, as described later, unlike FIG. 7, a pedestal for avoiding a gouging E' is further provided (see pedestal 3c in FIG. 3)) will be described as an example. The seal part 1 manufactured by the molding die of the present embodiment (see FIG. 3) corresponds to an embodiment of the seal part of the present invention.

Figure 1:
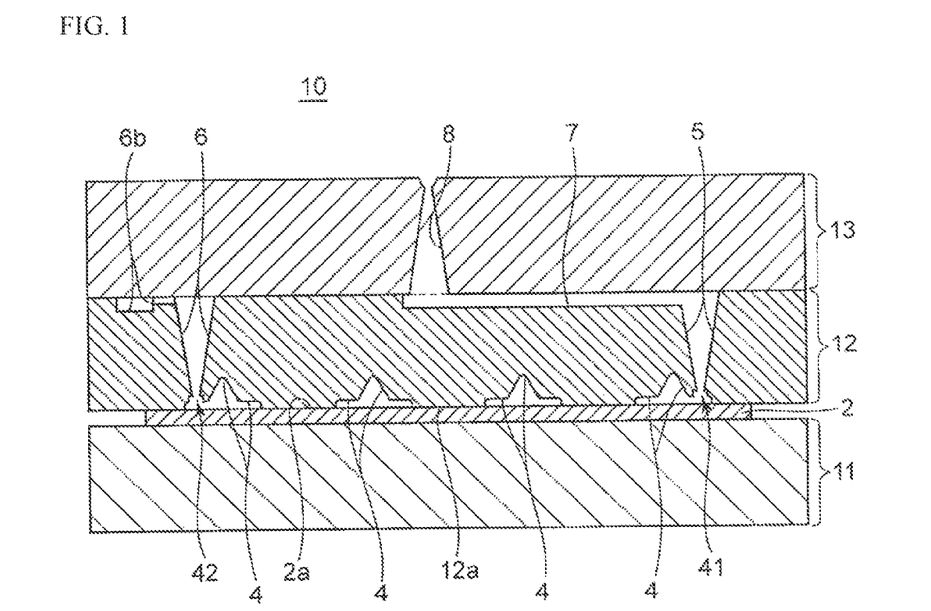
FIG. 1 is a schematic cross-sectional view of a molding die according to an embodiment of the present invention for molding an endless-shaped gasket made of an elastic material and extending along a surface of a base material.

FIG. 1 is a schematic cross-sectional view of a molding die 10 according to an embodiment of the present invention for molding an endless-shaped gasket 3 made of an elastic material and extending along a surface 2a of a plate-like base material 2.

In FIG. 1, similarly to FIG. 6 described above, the cross section of the molding die 10 of the portion for realizing the cross-sectional shape of the seal part of the manufacturing object (see the seal part 1 of FIG. 3 described later) is shown. In FIG. 1, the same components as those of the conventional molding die 10' described above with reference to FIGS. 6 and 7 are denoted by the same reference numerals, and the same reference numerals are used in the following description. The molding die 10 comprises a cavity portion 4, a gate 5, a first intermediate portion 41, a vent 6, and a second intermediate portion 42.

As described above, the cavity portion 4 is formed on the opposing surface 12a of the molding die 10 opposed to the surface 2a of the base material 2, and has a mold shape corresponding to the endless shape of the gasket 3 in FIGS. 4 and 5.

The gate 5 is a hole extending toward the cavity portion 4 in the molding die 10, and is a hole for introducing a flowable molding material, which is cured to become the elastic material, into the cavity portion 4. As shown in FIG. 1, the gate 5 has a shape that tapers toward the cavity portion 4, and the tip of the tapered shape is open toward the cavity portion 4 side to be an opening 5a (see FIG. 2 below) through which the molding material flows out from the gate 5.

The first intermediate portion 41 forms an intermediate space between the gate 5 and the cavity portion 4, and serves to receive the molding material from the gate 5 and feed it into the cavity portion 4 through the opening 5a.

Figure 2:
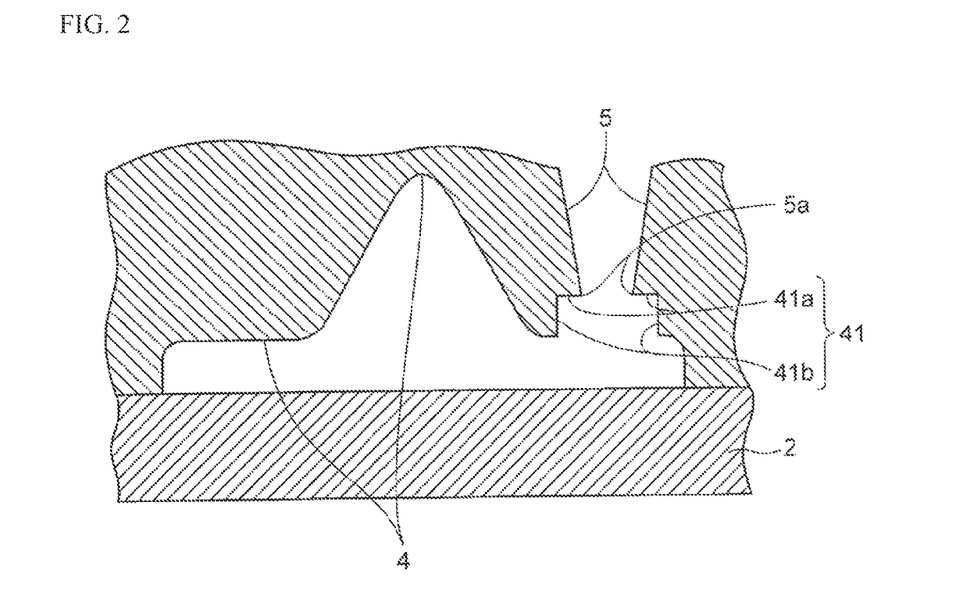
FIG. 2 is an enlarged view of the periphery of the first intermediate portion in the cross-sectional view of FIG. 1.

FIG. 2 is an enlarged view of the periphery of the first intermediate portion 41 in the cross-sectional view of FIG. 1.

The first intermediate portion 41 connects the opening 5a of the gate 5 which is open toward the cavity portion 4 side and the cavity portion 4, the cross section of the first intermediate portion 41 along the surface 2a of the base material 2 has a cross-sectional area equal to or larger than the opening area of the opening 5a of the gate 5. The technical effect of the first intermediate portion 41 having such a configuration will be described in detail later. In FIG. 2, as a specific example of such a configuration, the first intermediate portion 41 having a first bottom portion 41a extending along the surface 2a of the base material 2 around the opening 5a of the gate 5 and a cylindrical first side portion 41b extending toward the cavity portion 4 from the peripheral edge of the first bottom portion 41a and connecting the peripheral edge of the first bottom portion 41a and the cavity portion 4 is shown.

In the following, a description will be given based on such a specific example. The first intermediate portion of the present invention may be a first intermediate portion which does not have a first bottom portion 41a and is formed by a cylindrical first side portion extending toward the cavity portion 4 from the opening 5a of the gate 5 and directly connecting the opening 5a of the gate 5 and the cavity portion 4. In this case, the cross section of the first intermediate portion has the same cross-sectional area as the opening area of the opening 5a of the gate 5. Incidentally, "cylindrical" in the above description is not limited to the cylindrical shape in which the cross section is circular, but includes a shape having a cross section in which the outline is a smooth curve such as elliptical or racetrack-shape, and a shape having a cross section of a polygonal square tube. In addition, the first intermediate portion of the present invention may be a first intermediate portion which does not have a first bottom portion 41a and is formed by a tapered side portion extending toward the cavity portion 4 from the opening 5a of the gate 5 and directly connecting the opening 5a of the gate 5 and the cavity portion 4. In this case, the cross section of the first intermediate portion has a larger cross-sectional area than the opening area of the opening 5a of the gate 5.

Returning to FIG. 1, the description of the components will be continued.

The vent 6 is a hole extending in the direction away from the cavity portion 4 in the molding die 10, and serves as a flow path of unnecessary gas for discharging the unnecessary gas, which is unnecessary for molding the gasket 3 in the cavity portion 4, from the cavity portion 4. Here, the unnecessary gas is air in the cavity portion 4 extruded by the inflow of the molding material into the cavity portion 4 at the time of molding, volatile gas generated from the molding material, or the like. The excess molding material not used for molding the gasket 3 is also discharged from the cavity portion 4 through the vent 6, and the discharged excess molding material is stored in the excess material reservoir 6b provided in the molding die 10. As shown in FIG. 1, the vent 6, similarly to the gate 5, has a shape that tapers toward the cavity portion 4, and the tip of the tapered shape is open toward the cavity portion 4 side to be an opening 6a through which the molding material flows into the vent 6.

The second intermediate portion 42 forms an intermediate space between the cavity portion 4 and the vent 6, and serves to receive the molding material from the cavity portion 4 and feed it into the vent 6 through the opening 6a. The configuration of the second intermediate portion 42 is the same as that of the first intermediate portion 41 shown in FIG. 2. That is, the second intermediate portion 42 connects the opening 6a of the vent 6 which is open toward the cavity portion 4 side and the cavity portion 4, and the cross section of the second intermediate portion 42 along the surface 2a of the base material 2 has a cross-sectional area equal to or larger than the opening area of the opening 6a of the vent 6. The technical effect of the second intermediate portion 42 having such a configuration will be described in detail later. In the following, as a specific example of the second intermediate portion 42 of such a configuration, it will be described that, similarly to the configuration of the first intermediate portion 41 shown in FIG. 2, the second intermediate portion 42 has a second bottom portion extending along the surface 2a of the base material 2 around the opening 6a of the vent 6 and a cylindrical second side portion extending toward the cavity portion 4 from the peripheral edge of the second bottom and connecting the peripheral edge of the second bottom and the cavity portion 4. For this reason, the configuration of the second intermediate portion 42 will be described with reference to FIG. 2, and the illustration thereof is omitted here.

However, the second intermediate portion of the present invention may be a second intermediate portion which does not have the second bottom portion and is formed by a cylindrical second side portion extending toward the cavity portion 4 from the opening 6a of the vent 6 and directly connecting the opening 6a of the vent 6 and the cavity portion 4. In this case, the cross section of the second intermediate portion has the same cross-sectional area as the opening area of the opening 6a of the vent 6. In addition, the second intermediate portion of the present invention may be a second intermediate portion which does not have the second bottom portion and is formed by a tapered side portion extending toward the cavity portion 4 from the opening 6a of the vent 6 and directly connecting the opening 6a of the vent 6 and the cavity portion 4. In this case, the cross section of the second intermediate portion has a larger cross-sectional area than the opening area of the opening 6a of the vent 6.

In the following, the technical effect produced by the first intermediate portion 41 and the second intermediate portion 42 will be described in detail while briefly describing the flow of molding in the molding die 10.

At the time of molding, the molding material flows into the cavity portion 4 from the gate 5 through the first intermediate portion 41. The molding material flowed in fills all the cavity portion 4, while flowing along the cavity portion 4 extending along the surface 2a of the base material 2 with the cavity portion 4 as a flow path (see the shape of the gasket 3 in FIGS. 4 and 5 corresponding to the cavity portion 4). At this time, the air that was present in the cavity portion 4 before the molding material flowed in and the unnecessary gas such as volatile gas generated from the molding material are discharged from the cavity portion 4 to the vent 6 through the second intermediate portion 42 located on the opposite side of the horizontal direction from the first intermediate portion 41 in the cross-sectional view of FIG. 1. The excess molding material after filling all the cavity portions 4 is also discharged from the cavity portion 4 to the vent 6 through the second intermediate portion 42. Then, the molding material is cured (typically crosslinked and cured over time), thereby a gasket 3 (see FIGS. 4 and 5) made of an elastic material is formed on the surface 2a of the base material 2. In this stage, the molding material accumulated in the gate 5, the vent 6, the first intermediate portion 41, and the second intermediate portion 42 is also cured and connected to the gasket 3. The gasket 3 is separated from other portions when removing the base material 2 from the molding die 10', thereby the seal part 1 in which the gasket 3 is formed on the surface 2a of the base material 2 is completed.

When the gasket 3 is separated from other portions, such separation may be performed at a place originally belonging to the gasket 3 and a chipping (gouging) in which the surface 2a of the base material 2 is exposed may occur. In the state in which the surface 2a of the base material 2 is exposed as described above, there is a concern that the insulation property is deteriorated. However, the molding die 10 of the present embodiments is devised to suppress deterioration of insulation property due to gouging as described below.

Figure 3:
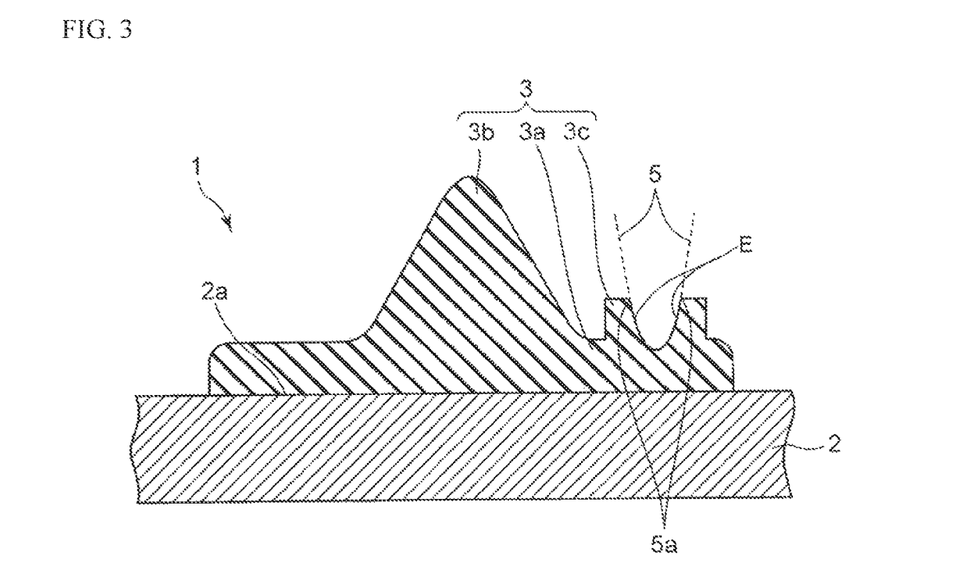
FIG. 3 is a schematic cross-sectional view showing a cross section of a seal part in the vicinity of the gate of FIG. 1.

FIG. 3 is a schematic cross-sectional view showing a cross section of the seal part 1 in the vicinity of the gate 5 of FIG. 1.

FIG. 3 shows a state in which the gouging E occurs at a place in the molding material because the separation was performed in the molding material cured in the first intermediate portion 41 of FIG. 2 outside the opening 5a of the gate 5. Since the first intermediate portion 41 is interposed between the gate 5 and the cavity portion 4 in this way (see FIG. 2), unlike the state of FIG. 7, the gouging E does not extend to the surface 2a of the base material 2, and the deterioration of insulation property due to gouging is suppressed. Although the technical effect of the first intermediate portion 41 has been described above by taking the gouging E occurred in the vicinity of the gate 5 as an example, the second intermediate portion 42 exhibits the same technical effect with respect to the gouging occurred in the vicinity of the vent 6.

As described above, in the present embodiment, the presence of the first intermediate portion 41 and the second intermediate portion 42 realizes a molding die that suppresses deterioration of insulation property due to gouging.

Here, a seal part 1 of FIG. 3 including a plate-like base material 2 and an endless-shaped gasket 3 formed on a surface 2a of the base material 2, made of an elastic material and extending along the surface 2a of the base material 2 corresponds to an embodiment of the seal part of the present invention. As described above, the gasket 3 is formed by injecting a flowable molding material, which is cured to become an elastic material by curing, into the molding die 10 having the gate 5 and the vent 6. In addition to the base portion 3a and the seal lip portion 3b described above in FIGS. 3 and 4, the gasket 3 has a pedestal 3c protruding in a direction away from the surface 2a of the base 2 in a position close to the gate 5 at the time of molding (i.e., the closest position to the opening 5a of the gate 5), and a position close to the vent 6 at the time of molding (i.e., the closest position to the opening 6a of the vent 6), respectively. The presence of such a pedestal 3c makes the gouging that exposes the surface of the base material less likely to occur, and the deterioration of the insulation property due to gouging is suppressed.

Returning to FIG. 1, the configuration of the molding die 10 will be described in more detail.

The molding die of the present invention is preferably a split-typed molding die such as a molding die 10 shown in FIG. 1. The split-typed molding die 10 is provided with three split molds of a first split mold 11, a second split mold 12, and a third split mold 13, and an assembly of these three split molds functions as one molding die 10. Hereinafter, the individual split mold will be described.

The first split mold 11 is a split mold on which the base material 2 is placed in contact with a surface of the base material 2 on the opposite side of the surface 2a of the base material 2.

The second split mold 12 is a split mold for fixing the base material 2 by sandwiching the base material 2 with the first split mold 11, and has an opposing surface 12a in which the cavity portion 4 of FIG. 1 is formed as a surface on which the base material 2 is sandwiched. The gate 5, the first intermediate portion 41, the vent 6, and the second intermediate portion 42 described above with reference to FIG. 1 are formed inside the second split mold 12. Furthermore, the runner 7 extending in a direction along the base material 2 in the surface of the second split mold 12 on the opposite side of the opposing surface 12a and is connected to the gate 5 is formed.

The third split mold 13 is a split mold which is laminated on the surface of the second split mold 12 on the opposite side of the opposing surface 12a. The third split mold 13 is formed with a spool 8 that penetrates the third split mold 13 and is connected to the runner 7 of the second split mold 12.

In such a split-typed molding die 10, first, the base material 2 is sandwiched between the first split mold 11 and the second split mold 12 and fixed in the manner described above, and the molding material is injected into the spool 8 of the third split mold 13 laminated on the surface of the second split mold 12. The molding material injected into the spool 8 flows through the runner 7 at the top of the second split mold 12 to reach the gate 5. Then, the molding material flows into the cavity portion 4 through the gate 5 and the first intermediate portion 41, and fills all the cavity portion 4 while flowing along the cavity portion 4 extending along the surface 2a of the base material 2 with the cavity portion 4 as a flow path. The excess molding material after filling all the cavity portions 4 is discharged from the cavity portion 4 to the vent 6 through the second intermediate portion 42, and is stored in the excess material reservoir 6b. After the molding material is cured, the base material 2 having a gasket 3 formed on the surface 2a is removed from between the first split mold 11 and the second split mold 12, thereby completing the seal part 1.

By using the split-typed molding die 10 in this manner, the gasket 3 can be formed efficiently on the surface 2a of the base material 2.

The above is the description of the present embodiment.

In the above, the case of manufacturing the seal part 1 for the separator of the fuel cell has been described as an example. The molding die of the present invention can be used for any seal part of the type in which an endless-shaped gasket extending along the surface of the base material is formed. Therefore, it may be used in the manufacture of seal parts other than the seal parts for the separator of the fuel cell.

The present invention is useful for suppressing deterioration of insulation property due to gouging.

The invention claimed is:

1. A molding die for molding, on a surface of a plate-like base material, an endless-shaped gasket made of an elastic material and extending along the surface of the plate-like base material comprising:
   a cavity portion formed on an opposing surface of the molding die opposed to the surface of the base material and having a mold shape corresponding to the endless shape of the gasket;
   a gate having a frusto-conically shaped cross-section extending toward the cavity portion in the molding die and configured to introduce a flowable molding material, which is cured to become the elastic material, into the cavity portion;
   a first intermediate portion configured to receive the molding material from the gate and feeding to the cavity portion, wherein the first intermediate portion includes a first annular bottom surface and a first cylindrical surface, the first annular bottom surface being connected to and extending radially outward from an opening of the gate that is connected to the cavity portion such that the first annular bottom surface is configured to face the surface of the plate-like base material, and the first cylindrical surface is connected to the first annular bottom surface and extends in a direction toward the surface of the plate-like base material, wherein a cross section of the first intermediate portion along the surface of the base material has a cross-sectional area equal to or larger than an opening area of the opening of the gate;
   a vent having a frusto-conically shaped cross-section extending in a direction away from the cavity portion in the molding die and configured to discharge an unnecessary gas unnecessary for molding the gasket in the cavity portion from the cavity portion; and
   a second intermediate portion configured to receive the unnecessary gas from the cavity portion and feeding to the vent, wherein the second intermediate portion includes a second annular bottom surface and a second cylindrical surface, the second angular bottom surface being connected to an extending radially outward from an opening of the vent that is connected to the cavity portion such that the second annular bottom surface is configured to face the surface of the plate-like base material, and the second cylindrical surface is connected to the second annular bottom surface and extends in a direction toward the surface of the plate-like base material, wherein a cross section of the second intermediate portion along the surface of the base material has a cross-sectional area equal to or larger than an opening area of the opening of the vent.

2. The molding die according to claim 1, wherein the molding die is a split-typed molding die, comprising:
   a first split mold configured to mount the base material in contact with a surface of the base material on the opposite side of the surface of the base material;
   a second split mold configured to fix the base material by sandwiching the base material with the first split mold, wherein the second split mold has the opposing surface on which the cavity portion is formed as a surface on which the base material is sandwiched, and the gate, the first intermediate portion, the vent, and the second intermediate portion are formed inside the second split mold, and further a runner extending in a direction along the base material on a surface on the opposite side of the opposing surface and connected to the gate is formed inside the third split mold; and
   a third split mold laminated on the surface on the opposite side of the second split mold, wherein a spool penetrating the third split mold and connected to the runner of the second split mold is formed inside the third split mold.

3. The molding die according to claim 1, wherein the molding die is a molding die configured to manufacture a seal part for a fuel cell in which the gasket is integrally molded on the base material.

* * * * *